United States Patent [19]

Tanaka

[11] Patent Number: 5,177,524
[45] Date of Patent: Jan. 5, 1993

[54] DEVICE FOR CONTROLLING AUTOMATIC FOCUSING LENS DEVICE

[75] Inventor: Hitoshi Tanaka, Tokyo, Japan

[73] Assignee: Asahi Kogaku Kogyo Kabushiki Kaisha, Tokyo, Japan

[21] Appl. No.: 655,832

[22] Filed: Feb. 15, 1991

[30] Foreign Application Priority Data

Feb. 17, 1990 [JP] Japan .................................. 2-37002
Feb. 17, 1990 [JP] Japan .................................. 2-37003

[51] Int. Cl.⁵ ............................................. G03B 3/00
[52] U.S. Cl. ................................ 354/400; 354/195.1
[58] Field of Search .......................... 354/400, 195.1

[56] References Cited

U.S. PATENT DOCUMENTS

| | | | |
|---|---|---|---|
| 4,309,077 | 1/1982 | Tomori | 354/195.1 |
| 4,349,258 | 9/1982 | Kitai et al. | 354/195.1 |
| 4,359,276 | 11/1982 | Tomori | 354/195.1 |
| 4,553,817 | 11/1985 | Ando et al. | 354/400 |
| 4,568,165 | 2/1986 | Ishibashi | 354/195.1 |
| 4,890,132 | 12/1989 | Hama | 354/400 |
| 4,893,145 | 1/1990 | Matsuda | 354/400 |
| 4,962,399 | 10/1990 | Numako et al. | 354/195.1 |

FOREIGN PATENT DOCUMENTS 1-205112  8/1989  Japan .

OTHER PUBLICATIONS

English Abstract of Japanese Patent 1-205112.

Primary Examiner—Michael L. Gellner
Assistant Examiner—Jae N. Noh
Attorney, Agent, or Firm—Sandler, Greenblum & Bernstein

[57] ABSTRACT

A control device of an automatic focusing lens which can be operated in an automatic focusing mode and a manual focusing mode. The control device is provided with a lens moving ring to which a lens and a clutch are connected. The clutch is selectively connected to a motor or a friction member. In the manual focusing mode, the clutch is connected to the friction member and disconnected from the motor. In the automatic focusing mode, the clutch is connected to the motor and disconnected from the friction member. The control device further includes a restricting mechanism by which a movement of the lens is restricted in the automatic focusing mode, and a switching mechanism by which the automatic focusing lens is switched to be operated in the automatic focusing mode or the manual focusing mode, and the restricting mechanism is activated. The switching mechanism is constructed as a single mechanism.

25 Claims, 10 Drawing Sheets

DEVICE FOR CONTROLLING AUTOMATIC FOCUSING LENS DEVICE

BACKGROUND OF THE INVENTION

1. Field of the Invention

The present invention relates to an automatic focusing lens which can be switched between an automatic focusing operation (hereinafter refered to as AF) mode and a manual focusing operation (hereinafter refered to as MF) mode.

2. Description of the Related Art

Conventionally, a camera having an automatic focusing lens which can be switched between an AF mode and an MF mode is known. The automatic focusing lens is provided with a drive shaft which, in the AF mode, is connected to a motor housed in the camera body to move a lens along the optical axis. In the MF mode, the drive shaft is disconnected from the motor so that the lens can be manually moved.

In such an automatic focusing lens, a focusing operation in the AF mode should be carried out at a high-speed, and an electric power consumption of the motor should be low, and therefore, a drive force for displacing the lens in the optical axis must be made as small as possible, to ensure a smooth movement of the lens.

If the drive force for displacing the lens along the optical axis is lowered, however, the lens can also be moved along the optical axis by a small force in the MF mode, and thus the operability of a manual focusing operation is not good. Especially, when carrying out close-up photography with a macro lens, the lens may be displaced along the optical axis by the weight of the lens, and thus may be unwantedly moved out of focus.

On the other hand, in a lens such as a macro lens in which a displacement amount along the optical axis during a focusing adjustment is large, the amount of displacement of the lens must be reduced for an AF operation, so that the lens does not repeat a movement along the optical axis in the AF operation. Accordingly, in the AF operation, the photographing mode must be switched between a full range automatic focusing adjustment in which an automatic focusing operation is carried out in a range between a shortest photographing distance and infinity, and a restricted automatic focusing adjustment in which an automatic focusing operation is carried out in a range between a shortest photographing distance and a predetermined photographing distance or between the predetermined photographing distance and infinity.

In an automatic focusing lens having a mechanism for switching between an AF mode and an MF mode, and a mechanism for switching between the full range automatic focusing adjustment and the restricted focusing adjustment, if separate mechanisms are provided for carrying out each switching operation, a large space is needed in the automatic focusing lens, and the construction thereof is complicated, and further, the switching operations are complicated.

SUMMARY OF THE INVENTION

Therefore, an object of the present invention is to provide a device for controlling an automatic focusing lens device in which a drive force for moving the lens along the optical axis is small in the automatic focusing mode, and the drive force is controlled to an appropriate amount in the manual focusing mode.

Another object of the present invention is to provide a device in which a space for housing a switching mechanism for carrying out switching operations in the manual focusing adjustment, the full range automatic focusing adjustment and the restricted automatic focusing adjustment is small, and the switching operation is simple.

According to the present invention, there is provided a device comprising a moving mechanism, a restraining mechanism and a control mechanism. The moving mechanism moves the lens along the optical axis thereof, and is driven through a drive source or by a photographer. The restraining mechanism imposes a resistance on the moving mechanism. The resistance is directed in a direction opposite to that in which the lens is moved. The control mechanism controls the moving mechanism such that the moving mechanism is connected to the drive source and disconnected from the restraining mechanism in an automatic focusing mode, and connected to the restraining mechanism and disconnected from the drive source in a manual focusing mode.

Further according to the present invention, the device comprises a restricting mechanism and a switching mechanism. The restricting mechanism restricts a range in which the lens is moved along the optical axis, and the switching mechanism switches a mode in which the lens is moved. The switching mechanism can set the lens to be moved without the drive source, set the lens to be moved through the drive source while activating the restricting means, or set the lens to be moved through the drive source without activating the restricting mechanism. The switching mechanism is constructed as a single mechanism.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
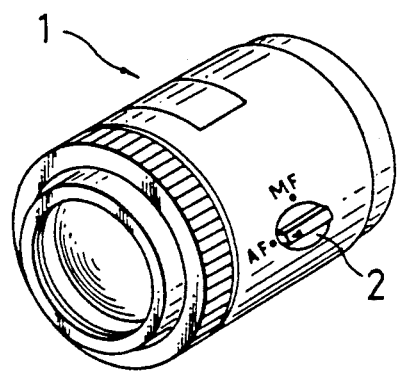
FIG. 1 is a view showing an appearance of an automatic focusing lens of a first embodiment of the present invention.

The present invention will now be described with reference to embodiments shown in the drawings.

FIGS. 1 through 8 show a first embodiment of the present invention.

FIG. 1 shows an automatic focusing lens 1 of a camera in which a focusing mode can be switched between an AF mode and an MF mode. A switching knob 2 for switching the mode between the AF mode and the MF mode is provided on an outer surface of the automatic focusing lens 1.

Figure 2:
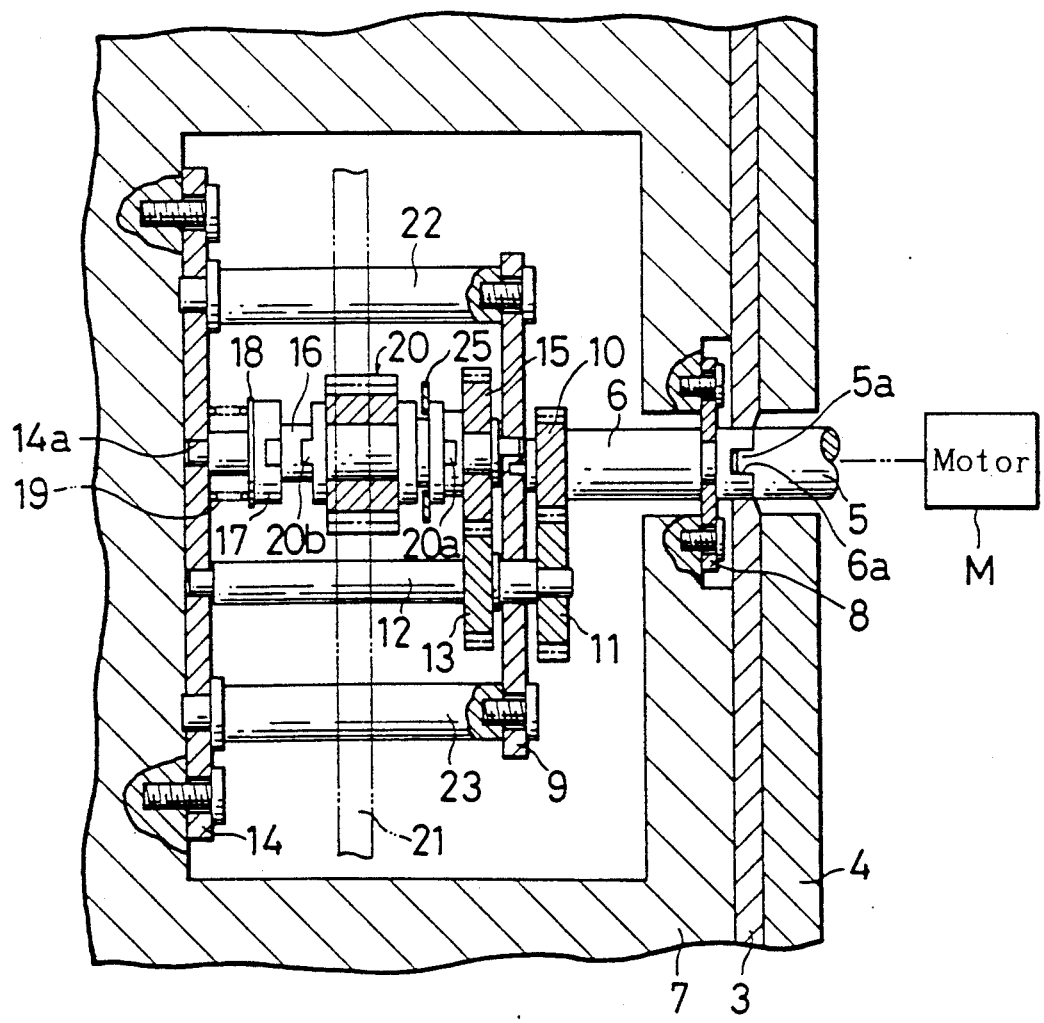
FIG. 2 is a sectional view showing a gear train of an automatic focusing mechanism in an AF mode.

As shown in FIG. 2, the automatic focusing lens is attached to a camera body in such a manner that a mount portion 3 of the automatic focusing lens is in contact with a mount portion 4 of the camera body.

Figure 3:
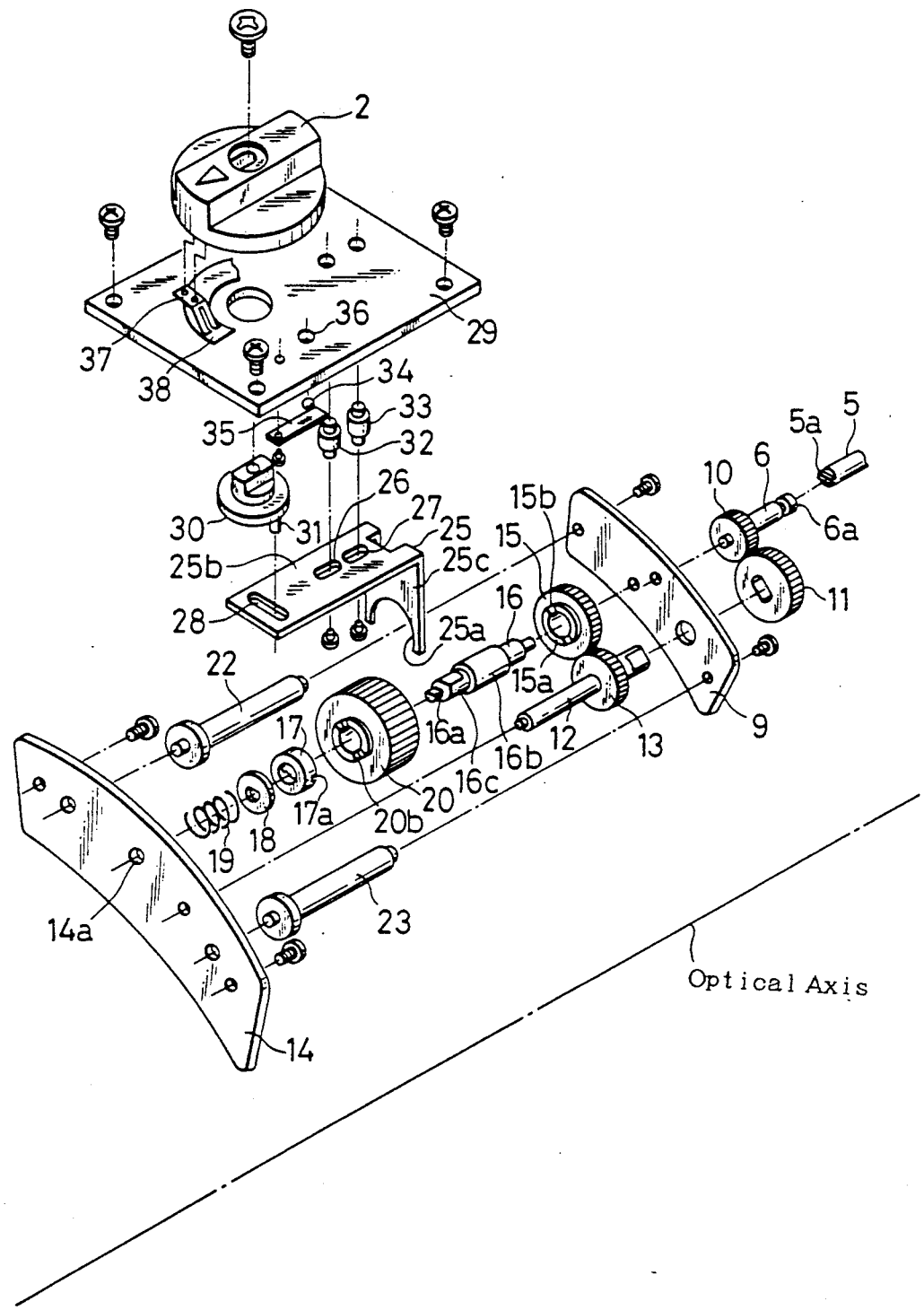
FIG. 3 is a perspective view showing the automatic focusing mechanism in a disassembled state.

As shown in FIGS. 2 and 3, a drive shaft 5 is mounted in the camera body and is driven by a motor M housed in the camera body, in the AF mode. A driven shaft 6 is provided in the automatic focusing lens coaxially with the drive shaft 5. A left end surface of the drive shaft 5 is provided with a projection 5a extending along a radial direction thereof, and a right end surface of the driven shaft 6 is provided with a recess 6a extending along a radial direction thereof. The projection 5a is engaged with the recess 6a so that the drive shaft 5 is connected to the driven shaft 6, whereby a rotation of the drive shaft 5 is transmitted to the driven shaft 6.

A right end portion of the driven shaft 6 is rotatably supported by a first bearing plate 8 fixed to an automatic focusing lens frame 7, and a left end portion of the driven shaft 6 is rotatably supported by a second bearing plate 9 disposed in the lens frame 7. A first gear 10 is formed on the driven shaft 6 to rotate with the driven shaft 6 as a single body, and is meshed with a second gear 11 provided on a gear shaft 12, to rotate with the gear shaft 12 as a single body, whereby a rotation of the drive shaft 5 is reduced and transmitted to the gear shaft 12.

The gear shaft 12 is provided with a third gear 13 as one body, and rotatably supported by the second bearing plate 9 between the second gear 11 and the third gear 13. A left end portion of the gear shaft 12 is rotatably supported by a third bearing plate 14 fixed on an inner wall of the frame 7. The second bearing plate 9 and the third bearing plate 14 are connected to each other by support pillars 22 and 23, to maintain a constant interval therebetween. The third gear 13 is meshed with a fourth gear 15 so that a rotation of the gear shaft 12 is reduced and transmitted to the fourth gear 15.

Figure 4:
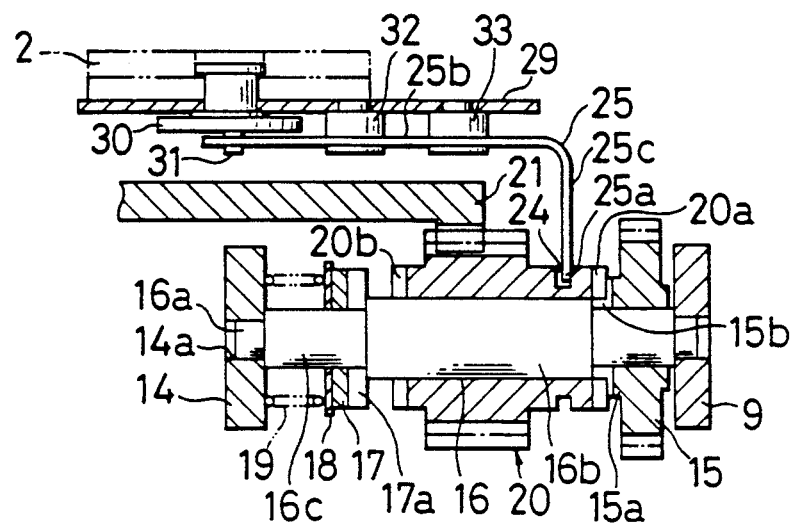
FIG. 4 is a sectional view showing a clutch mechanism of the automatic focusing mechanism in the AF mode.

With reference to FIGS. 2, 3 and 4, a clutch shaft 16 is rotatably supported by the second bearing plate 9 and the third bearing plate 14. An end portion 16a of the clutch shaft 16 is formed in a D-shape, and a hole 14a of the third bearing plate 14 is formed in a D-shape, and when the end portion 16a is inserted in the hole 14a, the clutch shaft 16 cannot be rotated. The clutch shaft 16 has a large diameter portion 16b at the center thereof, and the fourth gear 15 is provided between the second bearing plate 9 and the large diameter portion 16b, and is rotatable with the clutch shaft 16. The fourth gear 15 is substantially not displaced in an axial direction of the clutch shaft 16. A left end surface of the fourth gear 15 is provided with an annular projection 15a, and clutch grooves 15b extending in a radial direction of the end surface are formed on the annular projection 15a.

An annular friction member 17 and a washer 18 are fitted to a small diameter portion 16c formed between the end portion 16a and the large diameter portion 16b. The small diameter portion 16c is formed as a D-shape. The friction member 17 is rotatably supported by the clutch shaft 16, and the washer 18 has a D-shaped hole in which the small diameter portion 16c is inserted so that the washer 18 cannot be rotated relative to the clutch shaft 16. Therefore, the friction member 17 and the washer 18 are rotatable relative to and are in slidabe contact with each other, to thereby generate a frictional resistance. A right end surface of the friction member 17 is provided with clutch grooves 17a which can be engaged with a clutch projection 20b of a clutch gear 20, as described later. A compression coil spring 19 is disposed between the washer 18 and the third bearing plate 14, so that the friction member 17 and the washer 18 are pressed against a left end portion of the large diameter portion 16b.

The clutch gear 20 is fitted to the large diameter portion 16b to be rotatable with the clutch shaft 16 and displacable along the axis of the clutch shaft 16. A right end surface of the clutch gear 20 is provided with a clutch projection 20a, and a left end surface of the clutch gear 20 is provided with the clutch projection 20b. The clutch projections 20a and 20b are extended in radial directions of the clutch gear 20, respectively, and are engagable with the clutch grooves 15b and 17a, respectively.

The clutch gear 20 is meshed with a lens moving ring 21 having an axis parallel to the optical axis, and a rotation of the lens moving ring 21 causes the automatic focusing lens to be moved along the optical axis. A manual operation ring, (not shown) rotated by a photographer to carry out a focus adjustment in an MF mode, is rotated in association with the lens moving ring 21. An outer surface of a right end portion of the clutch gear 20 is provided with an annular groove 24 with which an arc-shaped notch 25a formed in a movable plate 25 is engaged.

Figure 5:
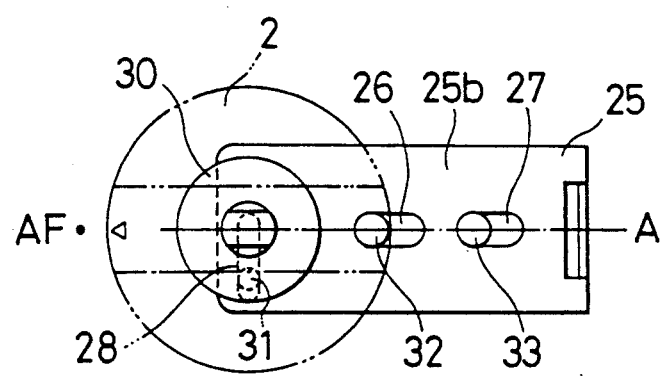
FIG. 5 is a plane view showing a switching knob in the AF mode.

With reference to FIGS. 3, 4 and 5, the movable plate 25 has an approximate L-shape, and comprises a long plate portion 25b extending along the optical axis and a short plate portion 25c which extends perpendicular to the long plate portion 25b and having the arc-shaped notch 25a. As shown in FIG. 5, the long plate portion 25b has two guide slots 26 and 27 which are extended along the center line A, which is parallel to the optical axis, and an engaging slot 28 which is provided to a left end of the long plate portion 25b and extended from a portion close to and perpendicular to the center line A.

As shown in FIGS. 3 and 4, a stationary plate 29 is disposed above the long plate portion 25b. The switching knob 2 is rotatably supported by an upper surface of the stationary plate 29, and a rotation disk 30 is disposed under the stationary plate 29 in such a manner that the rotation disk 30 is rotated with the switching knob 2 as a single body, and is coaxial with the switching knob 2. A drive pin 31 is formed on an under surface of the rotation disk 30 and extends downward. The drive pin 31 is fixed to the rotation disk 30 at a position offset from the rotation axis thereof, and engaged with the engaging slot 28. The stationary plate 29 is provided with two guide pins 32 and 33 which extend downward, and are engaged with the guide slots 26 and 27, respectively.

Figure 8:
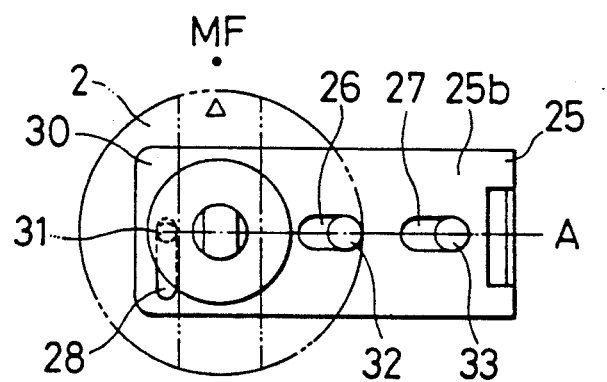
FIG. 8 is a plane view showing the switching knob in the MF mode.

When the switching knob 2 is turned to the AF position, as shown in FIG. 5, the drive pin 31 is positioned at a lower end portion of the engaging slot 28 and the guide pins 32 and 33 are positioned at the left end portions of the guide slots 26 and 27, respectively. Conversely, when the switching knob 2 is turned clockwise by 90 degrees to the MF position, as shown in FIG. 8, the movable plate 25 is displaced leftward in the drawing (toward an object to be photographed) along the optical axis, so that the drive pin 31 is positioned at an upper end portion of the engaging slot 28, i.e. on the center line A, and the guide pins 32 and 33 are positioned at the right end portions of the guide slots 26 and 27, respectively.

As shown in FIG. 3, a steel ball 34 is disposed under a ball hole 36 formed in the stationary plate 29, and is urged by a flat spring 35 to be pressed against a bottom surface of the switching knob 2. The bottom surface of the switching knob 2 is provided with an AF position hole (not shown) in which an upper portion of the steel ball 34 at the AF position is engaged, and an MF position hole (not shown) in which an upper portion of the steel ball 34 at the MF position is engaged, so that a click action is obtained when the switching knob 2 is moved to engage the AF position or the MF position.

A bottom surface of the switching knob 2 has a recess (not shown) in which a brush electrode 37 is disposed, and an electrode 38 corresponding to the brush electrode 37 is disposed on an upper surface of the stationary plate 29. The brush electrode 37 and the electrode 38 output a signal which indicates whether the focusing mode is the AF mode or the MF mode.

With reference to FIGS. 2, 4 and 5, when the switching knob 2 is moved to the AF position, the movable plate 25 is displaced rightward in the drawing, whereby the clutch gear 20 is moved rightward. If the positions of the clutch grooves 15b of the fourth gear 15 and a position of the clutch projection 20a of the clutch gear 20 coincide, the clutch gear 20 is displaced rightward in the drawing so that the clutch projection 20a is fitted in the clutch grooves 15b, and as a result, a rotation of the fourth gear 15 is transmitted to the clutch gear 20.

Conversely, when the positions of the clutch grooves 15b of the fourth gear 15 and a position of the clutch projection 20a of the clutch gear 20 do not coincide, a right end surface of the clutch projection 20a is engaged with a left end surface of the annular projection 15a, and therefore, a tip portion of the short plate portion 25c of the movable plate 25 is elastically deformed toward a left direction in the drawing. As a result, the short plate portion 25c acts as a flat spring, and thus the clutch gear 20 is urged toward the fourth gear 15. At this time, when the fourth gear 15 is rotated by the motor M and the positions of the clutch grooves 15b and a position of the clutch projection 20a coincide, the clutch projection 20a is engaged in the clutch grooves 15b, and thus a rotation of the fourth gear 15 is transmitted to the clutch gear 20.

Further, when the switching knob 2 is positioned at the AF position, the clutch gear 20 is not engaged with the friction member 17. Since, the clutch gear 20 is disengaged from the friction member 17, and a rotation of the clutch gear 20 is not transmitted to the friction member 17 in the AF mode.

Still further, when the switching knob 2 is positioned at the AF position, a signal indicating the AF mode is outputted from the brush electrode 37 and the electrode 38 (FIG. 1), and thus the motor M is driven and a rotation of the drive shaft 5 is transmitted to the lens moving ring 21, to thereby carry out an automatic focusing operation.

A drive system for moving the lens along the optical axis by the motor M is constructed in such a manner that the necessary drive torque is small, and therefore, the focusing speed is high and the electric power consumption of the motor M is lowered.

Figure 6:
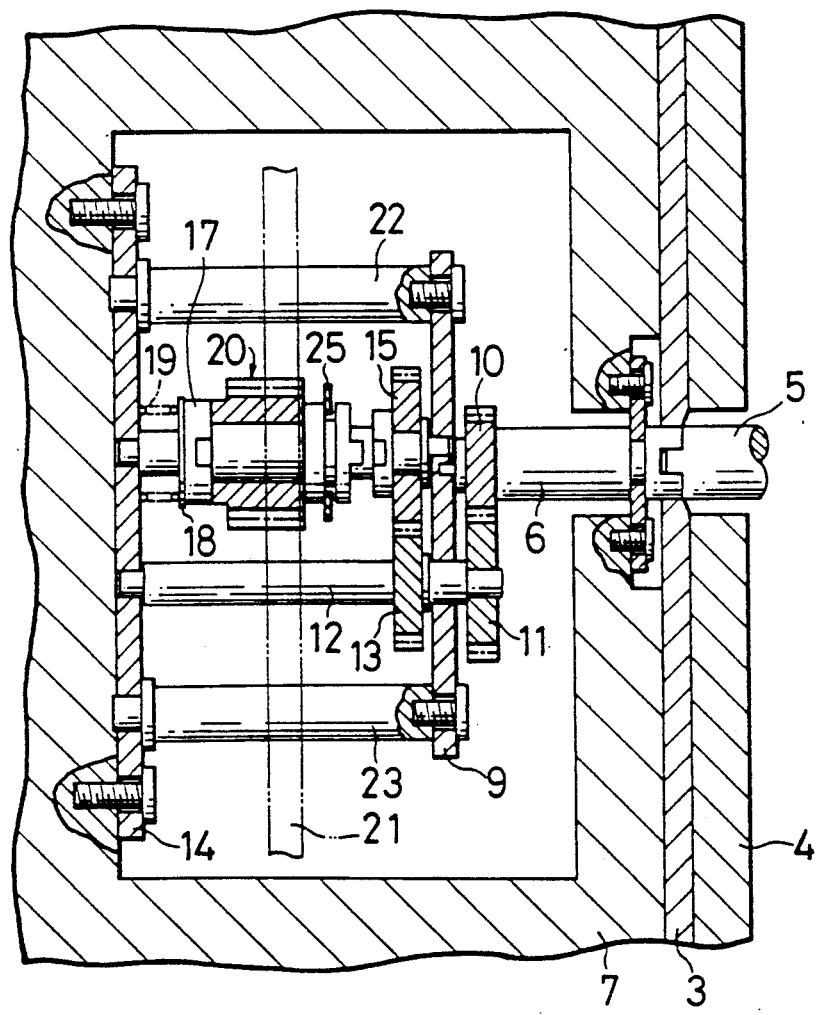
FIG. 6 is a sectional view showing the gear train in an MF mode.
Figure 7:
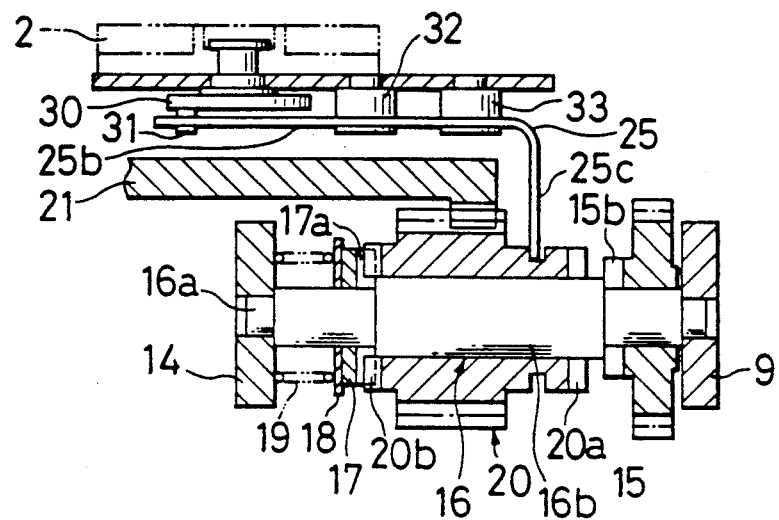
FIG. 7 is a sectional view showing the clutch mechanism in the MF mode.

With reference to FIGS. 6, 7 and 8, when the switching knob 2 is turned to the MF position, the movable plate 25 is displaced leftward in the drawing, whereby the clutch gear 20 is moved leftward. In this case, as in the above-described case, when the positions of the clutch grooves 17a of the friction member 17 and a position of the clutch projection 20b of the clutch gear 20 coincide, the clutch projection 20b is engaged in the clutch grooves 17a. Conversely, if the positions of the clutch grooves 17a and a position of the clutch projection 20b do not coincide, when a focus adjustment is carried out by a manual operation, the clutch gear 20 is rotated through the lens moving ring 21, and accordingly, when the positions of the clutch grooves 17a and the position of the clutch projection 20b coincide, the clutch projection 20b is fitted in the clutch grooves 17a by the spring force of the short plate portion 25c.

When the switching knob 2 is at the MF position, the clutch gear 20 is not engaged with the fourth gear 15, and therefore, a rotation of the clutch gear 20 is not transmitted to the fourth gear 15. Accordingly, when the lens is displaced along the optical axis by a manual operation, the lens moving ring 21 is rotated, and a rotation of the lens moving ring 21 is transmitted to the friction member 17 through the clutch gear 20. Since the washer 18 urged against the friction member 17 can not be rotated, a friction force in a direction opposite to the rotating direction occurs at the contact surfaces of the friction member 17 and the washer 18. Therefore, a force or resistance in the direction opposite to that in which the lens is moved, is imposed by the lens.

By properly selecting a contact area of the friction member 17 and the washer 18, a friction coefficient of the contact surface, and an urging force of the compression coil spring 19, the friction force can control the drive force requirements for the lens to a drive force that is appropriate for a manual operation, so that the operability of the manual focusing adjustment is improved. Further, at this time, since a signal indicating the MF mode is outputted from the brush electrode 37 and the electrode 38 (FIG. 1), a drive of the motor M is prohibited.

According to this embodiment, in the AF mode, a drive torque necesary for moving the lens along the optical axis is reduced, and thus the focusing speed is made high and an electric power consumption of the motor M is lowered. In the MF mode, the amount of drive force for the lens is controlled to that most suitable for the manual focusing operation, and thus the operability of the manual focusing operation is improved.

Since a switching between the AF mode and the MF mode is carried out by converting a rotation of the switching knob 2 to a linear movement of the movable plate 25, a large space for the operation mechanism (i.e., the switching knob 2) is not needed, and thus the operation mechanism is miniaturized. Further, since the switching knob 2 is rotatable, a stroke of the brush electrode 37 outputting a signal for determining the AF and MF modes can be large, even though a space for housing the selection mechanism is small.

FIGS. 9 through 16 show a second embodiment of the present invention.

Figure 9:
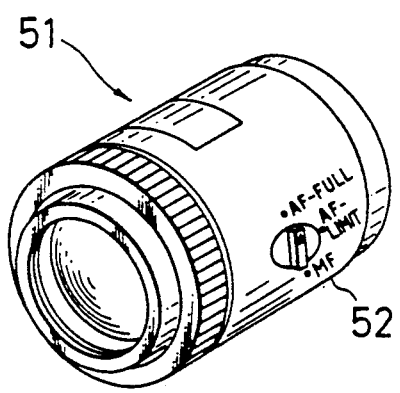
FIG. 9 is a view showing an appearance of an automatic focusing lens of a second embodiment of the present invention.

FIG. 9 shows an automatic focusing lens 51 of a camera in which a focusing mode can be switched between an AF-FULL mode, an AF-LIMIT mode, and an MF mode. The AF-FULL mode means that an automatic focusing operation is carried out over a full distance range, i.e., between the shortest photographing distance and infinity. The AF-LIMIT mode means that an automatic focusing operation is carried out over a range between a shortest photographing distance and a predetermined photographing distance or between the predetermined photographing distance and infinity. A switching knob 52 for switching the mode among the AF-FULL mode, the AF-LIMIT mode and the MF mode is provided on an outer surface of the automatic focusing lens 51.

Namely, when the switching knob 52 is turned to the AF-FULL position, the automatic focusing operation is carried out over a range between the shortest photographing distance and infinity; when the switching knob 52 is turned to the AF-LIMIT position, the automatic focusing operation is carried out over a range between the shortest photographing distance and the predetermined photographing distance, or between the predetermined photographing distance and infinity, and when the switching knob 52 is turned to the MF position, a manual focusing operation is carried out. The predetermined photographing distance is set to the optimum value for each automatic focusing lens. For example, in a macro lens having a focal length of approximately 100 mm, this is often set to a photographing length by which a magnification of about ¼ is obtained.

The construction of a gear train of the second embodiment is the same as that of the first embodiment as shown in FIGS. 2 and 6. Therefore, in the second embodiment, only the construction differences from the first embodiment are described below, and the parts which are the same as those of the first embodiment are indicated by the same reference numerals as in the first embodiment.

Figure 10:
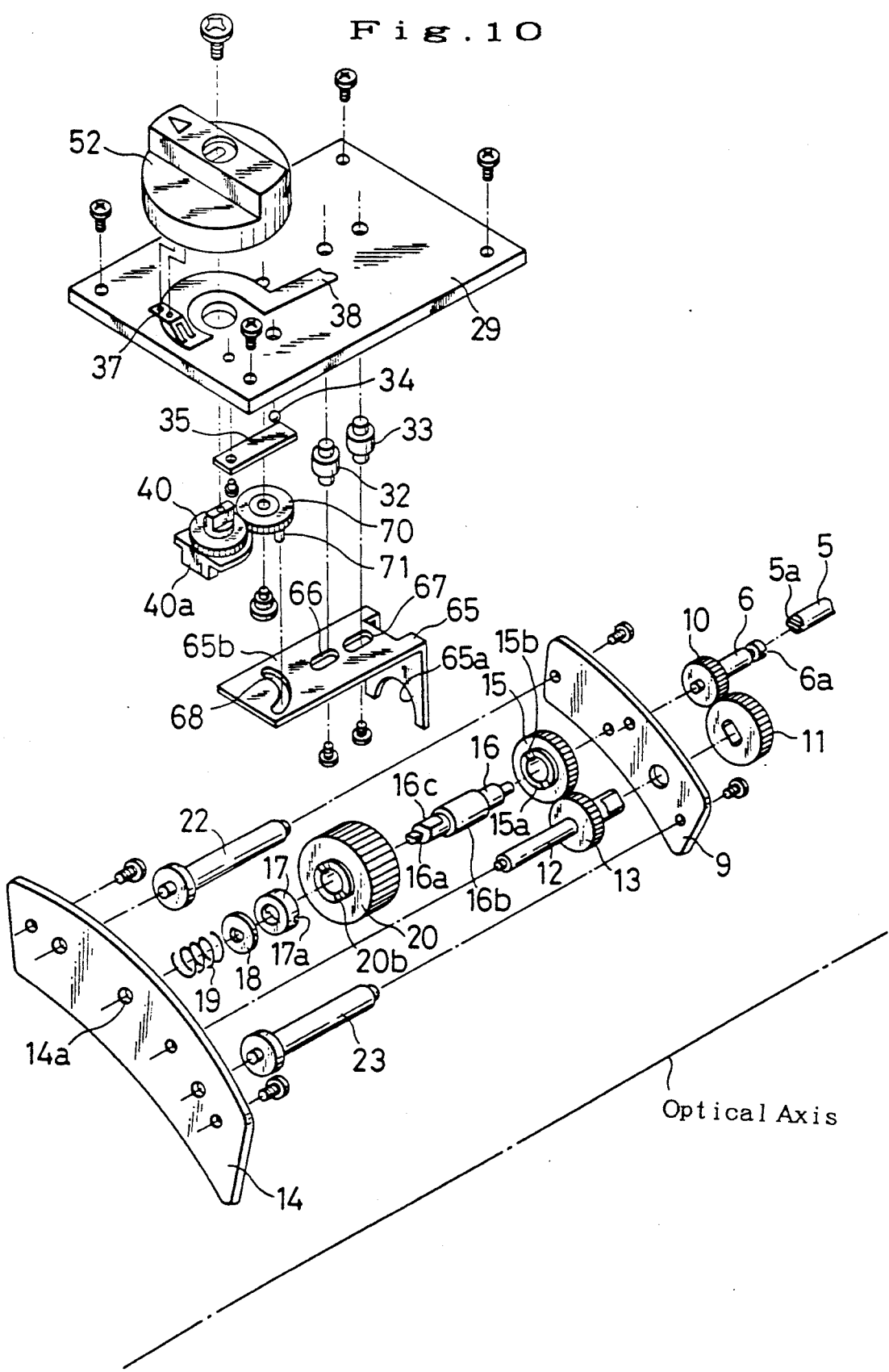
FIG. 10 is a perspective view showing the automatic focusing mechanism of the second embodiment in a disassembled state.

In FIG. 10, a drive shaft 5 is driven by a motor (not shown) housed in a camera body, in the AF-FULL mode and the AF-LIMIT mode. A rotation of the drive shaft 5 is transmitted to a clutch gear 20 and a lens moving ring 21 shown in FIG. 11, so that a lens in the automatic focusing lens is moved to carry out an automatic focusing operation. In the MF mode, the clutch gear 20 is released from the driven shaft 5, and thus the lens moving ring 21 can be rotated only in a manual operation by a photographer, as in the first embodiment. A stop screw 41 is connected to the lens moving ring 21 and is engagable with a stopper 40a which is described later.

Figure 11:
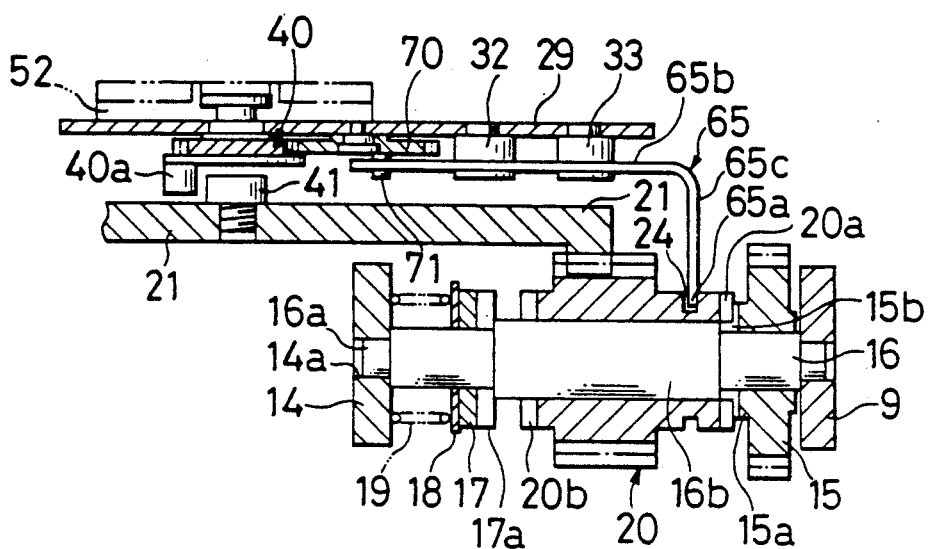
FIG. 11 is a sectional view showing a clutch mechanism of the automatic focusing mechanism in an AF-FULL mode.
Figure 12:
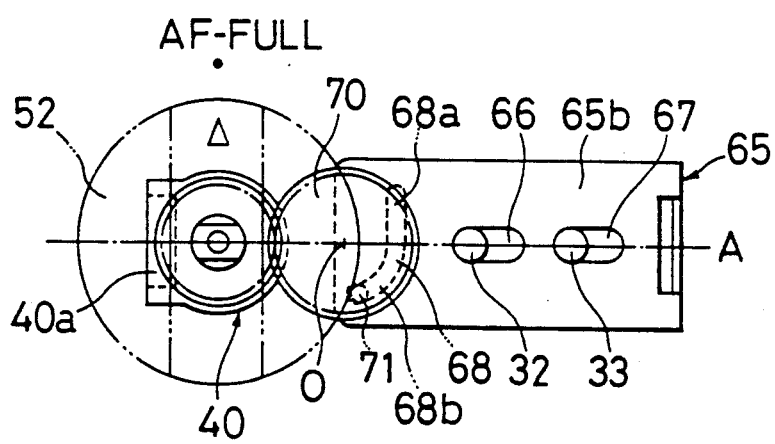
FIG. 12 is a plane view showing a switching knob in the AF-FULL mode.

With reference to FIGS. 10, 11 and 12, a movable plate 65 corresponds to the movable plate 25 in the first embodiment. The movable plate 65 has an approximate L-shape, and comprises a long plate portion 65b extending along the optical axis and a short plate portion 65c which extends perpendicular to the long plate portion 65b and has an arc-shaped notch 65a. As shown in FIG. 12, the long plate portion 65b has two guide slots 66 and 67 extended along the center line A, which are parallel to the optical axis, and an engaging slot 68 provided at a left end of the long plate portion 65b. The engaging slot 68 has a linear portion 68a extending upward from the center line A, as shown in FIG. 12, and an arc portion 68b is connected to the linear portion 68a and formed by a quadrant having a center located on a left part on the center line A in the drawing.

As shown in FIGS. 10 and 11, a stationary plate 29 is provided above the long plate portion 65b. The switching knob 52 is rotatably provided on an upper surface of the stationary plate 29, and a control gear 40 is disposed on an under surface of the stationary plate 29, coaxially with the switching knob 52 and rotatably with the switching knob 52 as a single body. The stopper 40a is a rectangular parallelepiped, and is integrally formed on an under surface of the control gear 40 at a position offset from the center of the control gear 40. The stopper 40a rotates in association with the switching knob 52.

A movable plate drive gear 70 is rotatably provided on an under surface of the stationary plate 29 and meshed with the control gear 40, and thus a rotation of the switching knob 52 is also transmitted to the movable plate drive gear 70. An under surface of the movable plate drive gear 70 is provided with a drive pin 71, which is extends downward at an offset position offset from the rotation axis of the movable plate drive gear 70. The drive pin 71 is inserted in the engaging slot 68. The distance between the rotation axis of the movable plate drive gear 70 and the drive pin 71 coincides with the radius of the arc portion 68b of the engaging slot 68.

The stationary plate 29 is provided with two guide pins 32 and 33 which extends downward, and are engaged with the guide slots 66 and 67, respectively.

As shown in FIG. 10, a steel ball 34 is disposed under a ball hole 36 formed in the stationary plate 29, and is urged by a flat spring 35 to be pressed against a bottom surface of the switching knob 52, as in the first embodiment.

The switching knob 52 is positioned at the AF-LIMIT position, by a clockwise rotation of 90 degrees from the AF-FULL position, and is positioned at the MF position by a further clockwise rotation of 90 degrees from the AF-LIMIT position. Therefore, a bottom surface of the switching knob 52 is provided with an AF-FULL position hole (not shown) in which an upper portion of the steel ball 34 at the AF-FULL position is engaged, an AF-LIMIT position hole (not shown) in which the upper portion of the steel ball 34 at the AF-LIMIT position is engaged, and an MF position hole (not shown) in which the upper portion of the steel ball 34 at the MF position is engaged, whereby a click action is obtained when the switching knob 52 is moved to the AF-FULL position, the AF-LIMIT position and the MF position.

A bottom surface of the switching knob 52 has a recess (not shown) in which a brush electrode 37 is disposed, and an electrode 38 corresponding to the brush electrode 37 is disposed on an upper surface of the stationary plate 29. The brush electrode 37 and the electrode 38 output a signal determining whether the focusing mode is the AF-FULL mode, the AF-LIMIT mode or the MF mode.

With reference to FIG. 12, when the switching knob 52 is positioned at the AF-FULL position, the drive pin 71 is positioned at a lower end portion of the arc portion 68b of the engaging slot 68, and the guide pins 32 and 33 are positioned at the respective left end portions of the guide slots 66 and 67. At this time, as shown in FIG. 11, the movable plate 65 is displaced rightward, and thus the clutch gear 20 is also moved rightward in the drawing. The action by which a clutch projection 20a of the clutch gear 20 and clutch grooves 15b of the fourth gear 15 are engaged with each other is the same as in the first embodiment, and thus a rotation of a fourth gear 15 is transmitted to the clutch gear 20.

Further, when the switching knob 52 is positioned at the AF-FULL position, the clutch gear 20 is not engaged with the friction member 17, and therefore, a rotation of the clutch gear 20 is not transmitted to the friction member 17.

Still further, when the switching knob 52 is positioned at the AF-FULL position, a signal indicating the AF-FULL mode is outputted from the brush electrode 37 and the electrode 38 (FIG. 10). Therefore, the motor is driven and a rotation of the drive shaft 5 is transmitted to the lens moving ring 21, to thereby carry out an automatic focusing operation.

At this time, as shown in FIGS. 10 and 11, the stopper 40a is moved in a direction in which a longitudinal axis of the stopper 40a is perpendicular to the center axis of the lens moving ring 21, and thus is not positioned on a rotational orbit along which the stop screw 41 is rotated due to a rotation of the lens moving ring 21. Therefore, the stop screw 41 is not engaged with the stopper 40a, and thus a rotation of the lens moving ring 21 is not prevented. Accordingly, an automatic focusing operation is carried out in a range between the shortest photographing distance and infinity.

Figure 13:
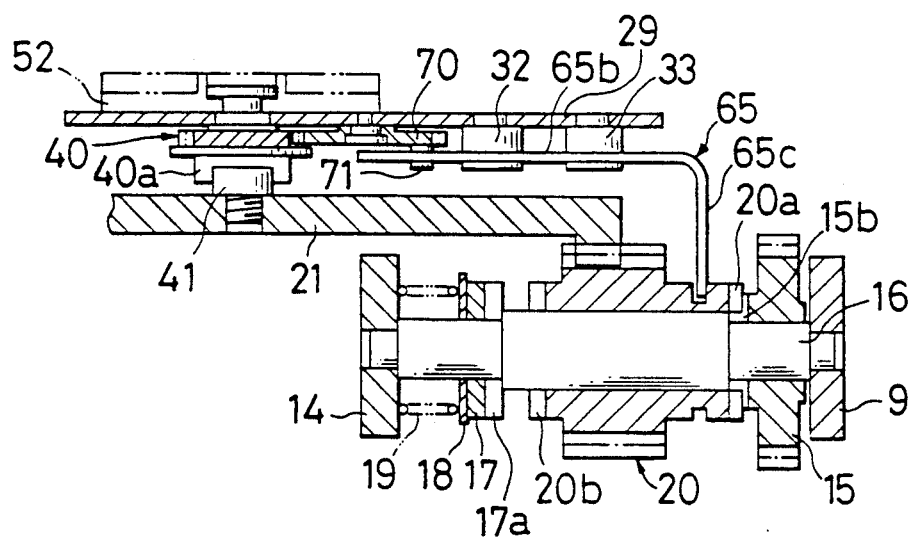
FIG. 13 is a sectional view showing the clutch mechanism in an AF-LIMIT mode.
Figure 14:
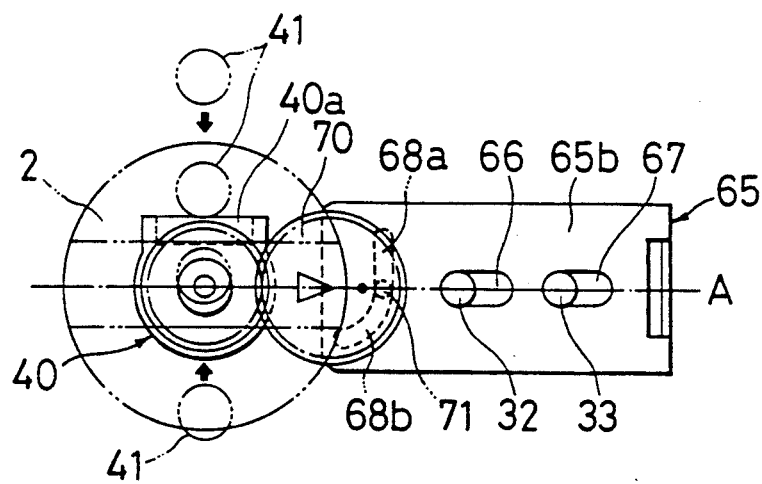
FIG. 14 is a plane view showing the switching knob in the AF-LIMIT mode.

Then, when the switching knob 52 is turned clockwise by 90 degrees to the AF-LIMIT position, as shown in FIG. 14, the drive pin 71 is rotated counterclockwise and moved along the arc portion 68b of the engaging slot 68 and displaced to the center line A. Accordingly, the movable plate 65 is not displaced from the AF-FULL position shown in FIG. 12, and the guide pins 32 and 33 are positioned at the left end portions of the guide slots 66 and 67, respectively. Therefore, the clutch projection 20a remains engaged in the clutch grooves 15b as shown in FIG. 13, and thus a rotation of the fourth gear 15 is transmitted to the clutch gear 20. When the switching knob 52 is positioned at the AF-LIMIT position, a signal indicating the AF-LIMIT mode is outputted from the brush electrode 37 and the electrode 38 (FIG. 10). As a result, the motor is driven so that a rotation of the drive shaft 5 is transmitted to the lens moving ring 21, to thereby carry out an automatic focusing operation.

At this time, as shown FIGS. 13 and 14, the stopper 40a is turned clockwise by 90 degrees, so that the longitudinal axis of the stopper 40a is in parallel to the center axis of the lens moving ring 21. Therefore, the stopper 40a is positioned on an orbit of the stop screw 41 during a rotation of the lens moving ring 21, and thus the stop screw 41 is engagable with the stopper 40a. Therefore, a rotation of the lens moving ring 21 is stopped midway in the rotation range thereof, and the movement range of the lens along the optical axis is restricted. Namely, an automatic focusing operation in a range between the shortest photographing distance and the predetermined photographing distance, or between the predetermined photographing distance and infinity is carried out. Accordingly, in an automatic focusing lens in which a displacement along the optical axis of the lens is large, the lens is prevented from repeating a large displacement along the optical axis, and thus the load on the motor is not increased.

Figure 15:
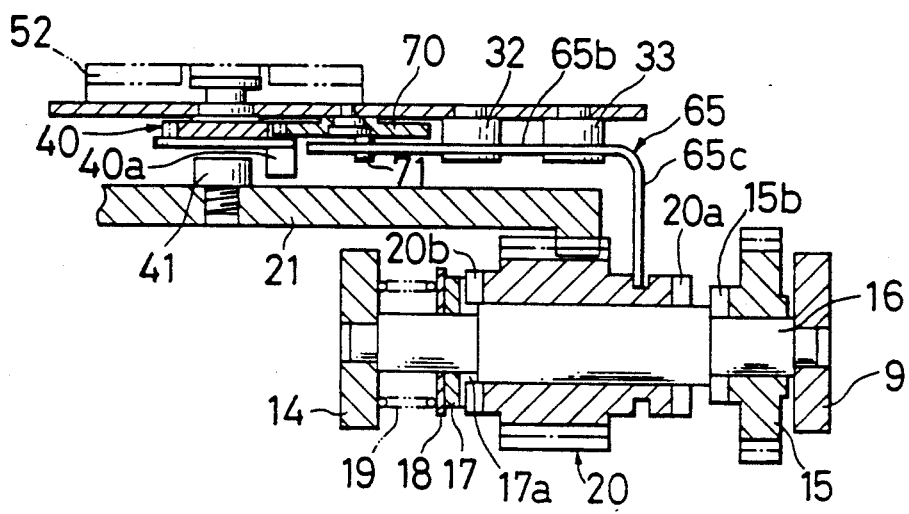
FIG. 15 is a sectional view showing the clutch mechanism in an MF mode.
Figure 16:
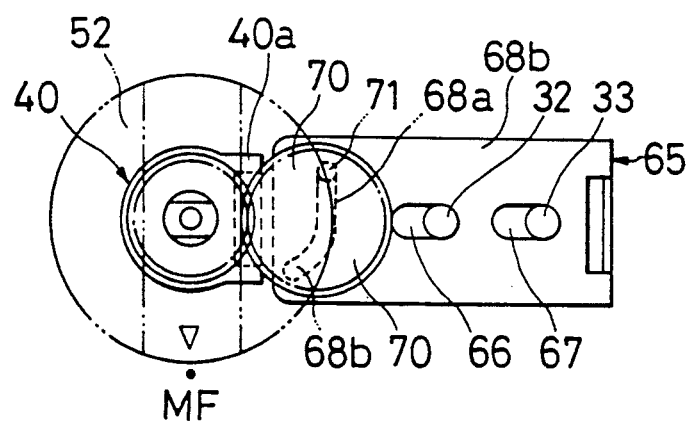
FIG. 16 is a plane view showing the switching knob in the MF mode.

When the switching knob 52 is turned further clockwise by 90 degrees and positioned at the MF position, as shown in FIG. 16, the drive pin 71 is rotated counterclockwise to be moved along the linear portion 68a of the engaging slot 68 and displaced to the upper end of the engaging slot 68. Accordingly, the movable plate 65 is pulled by the drive pin 71 and is displaced leftward in FIG. 16, and the guide pins 32 and 33 are positioned at the right end portions of the guide slots 66 and 67, respectively. Thus as shown in FIG. 15 the clutch gear 20 is displaced leftward. The action in which a clutch projection 20b of the clutch gear 20 and clutch projections 17a of the friction member 17 are engaged with each other is the same as in the first embodiment, and the effect of the friction member 17 is the same as in the first embodiment.

At this time, as shown in FIGS. 15 and 16, the stopper 40a is turned further clockwise by 90 degrees, and thus the longitudinal axis thereof is again perpendicular to the central axis of the lens moving ring 21. Accordingly, the stopper 40a is not located on the orbit along which the stop screw 41 is rotated. Therefore, the stop screw 41 is not engaged with the stopper 40a, and thus a rotation of the lens moving ring 21 is not prevented. Thus, a manual focusing operation can be carried out in a range between the shortest photographing distance and infinity.

As described above, according to the second embodiment, the switching between the AF mode and the MF mode, and between the AF-FULL mode and the AF-LIMIT mode are carried out by the single switching knob 52, and therefore, a space for housing the switching mechanism can be reduced and simplified, and further, the operation of switching the modes is simplified.

Further, according to the second embodiment, the same effect is obtained as in the first embodiment.

Although the embodiments of the present invention have been described herein with reference to the accompanying drawings, obviously many modifications and changes may be made by those skilled in this art without departing from the scope of the invention.

The present disclosure relates to subject matters contained in Japanese patent applications No. 2-37002 (filed on Feb. 17, 1990) and No. 2-37003 (filed on Feb. 17, 1990) which are expressly incorporated herein by reference in their entirety.

I claim:

1. A device for controlling an automatic focusing lens device which can be selectively operated in an automatic focusing mode or a manual focusing mode, said automatic focusing mode being carried out through a drive source and said manual focusing mode being carried out without said drive source, said control device comprising:

means for moving a lens included in said automatic focusing lens device along the optical axis thereof, said moving means being driven through said drive source or by a photographer;

means for restraining a resistance on said moving means, said resistance being directed in direction opposite to that in which said lens is moved; and means for controlling said moving means by connecting said moving means to said drive source and disconnecting said moving means from said restraining means in said automatic focusing mode, and connecting said moving means to said restraining means and disconnecting said moving means from said drive source in said manual focusing mode.

2. A control device according to claim 1, wherein said moving means are provided with a clutch, which is selectively connected to said drive source or said restraining means.

3. A control device according to claim 1, wherein said restraining means imposes a frictional resistance.

4. A control device according to claim 3, wherein said restraining means are provided with a friction member and a washer which are in slidable contact with each other and are rotatable relative to each other, to thereby generate a frictional resistance.

5. A control device according to claim 1, wherein said control means are provided with a movable member engaged with said moving means and having a guide slot extending along the optical axis and an engaging slot extending in a direction different from the optical axis, a stationary member having a guide pin engaged with said guide slot, and a switching knob movably supported by said stationary member and having a drive pin engaged with said engaging slot.

6. A control device according to claim 5, wherein said switching knob is rotatably supported by said stationary member, and said drive pin is provided at a position offset from the rotation axis of said switching knob.

7. A control device according to claim 1, further comprising:
   means for restricting a range in which said lens is moved along the optical axis; and
   means for switching a mode in which said lens is moved, said switching means being able to set said lens to be moved without said drive source, to set said lens to be moved through said drive source while activating said restricting means, or to set said lens to be moved through said drive source without activating said restricting means, said switching means being constructed as a single mechanism.

8. A control device according to claim 7, wherein said restricting means restricts a movement of said moving means.

9. A control device according to claim 8, wherein said restricting means are provided with a stationary member, a switching knob movably supported by said stationary member, a stopper movable in association with said switching knob, and a stop member connected to said moving means and engagable with said stopper in accordance with a position of said stopper.

10. A control device according to claim 9, wherein said switching knob is rotatably supported by said stationary member, and said stopper is provided at a position offset from the rotation axis of said switching knob.

11. A device for controlling an automatic focusing lens device which can be selectively operated in an automatic focusing mode or a manual focusing mode, said automatic focusing mode being carried out through a drive source and said manual focusing mode being carried out without said drive source, said control device comprising:
   means for moving a lens included in said automatic focusing lens device along the optical axis thereof;
   means for restricting a range in which said lens is moved along the optical axis; and
   means for switching a mode in which said lens is moved, said switching means being able to set said lens to be moved without said drive source, to set said lens to be moved through said drive source while activating said restricting means, or to set said lens to be moved through said drive source without activating said restricting means, said switching means being constructed as a single mechanism.

12. A control device according to claim 11, wherein said restricting means restrict said range so that said lens is moved between a shortest photographing distance and a predetermined photographing distance.

13. A control device according to claim 11, wherein said restricting means restrict said range so that said lens is moved between a longest photographing distance and a predetermined photographing distance.

14. A control device according to claim 11, wherein said restricting means restrict a movement of said moving means.

15. A control device according to claim 14, wherein said restricting means are provided with a stationary member, a switching knob movably supported by said stationary member, a stopper movable in association with said switching knob, and a stop member connected to said moving means and engagable with said stopper in accordance with a position of said stopper.

16. A control device according to claim 15, wherein said switching knob is rotatably supported by said stationary member, and said stopper is provided at a position offset from the rotation axis of said switching knob.

17. An automatic focusing lens device which can be operated through a drive source in an automatic focusing mode, or manually operated in a manual focusing mode, said device comprising:
   means for moving a lens included in said device, along the optical axis of said lens;
   means for restraining resistance against a movement of said lens, said resistance being directed in a direction opposite to that in which said lens is moved; and
   means for controlling said moving means, by connecting said moving means to said drive source in said automatic focusing mode, and connecting said moving means to said restraining means to impose said resistance in said manual focusing mode.

18. A device according to claim 17, further comprising:
   means for restricting a range in which said lens is moved along the optical axis.

19. A device according to claim 18, further comprising:
   means for switching a mode in which said lens is moved, said switching means being able to set said lens to be moved without said drive source, to set said lens to be moved thorough said drive source while activating said restricting means, or to set said lens to be moved through said drive source without activating said restricting means, said switching means being constructed as a single mechanism.

20. An automatic focusing lens device which can be operated through a drive source in an automatic focusing mode, or manually operated in a manual focusing mode, said device comprising:
   means for moving a lens included in said device along the optical axis of said lens;

means for restricting a range in which said lens is moved along the optical axis; and means for switching a mode in which said lens is moved, said switching means being able to set said lens to be moved without said drive source, to set said lens to be moved through said drive source while activating said restricting means, or to set said lens to be moved through said drive source without activating said restricting means, said switching means being constructed as a single mechanism.

21. A device for controlling an automatic focusing lens between an automatic focusing mode and a manual focusing mode, said device comprising:

a drive source;

means for operating said lens through said drive source in said automatic focusing mode;

means for operating said lens without said drive source in said manual focusing mode;

means for imposing a resistance on said lens in said manual focusing mode, said resistance being directed in a direction opposite to that in which said lens is moved.

22. A device for controlling an automatic focusing lens according to claim 21, wherein said resistance imposed by said resistance imposing means comprises a frictional resistance.

23. A device for controlling an automatic focusing lens according to claim 22, wherein said frictional resistance impedes the movement of said lens.

24. A device for controlling an automatic focusing lens according to claim 21, wherein said means for imposing a resistance imposes a resistance on said lens only in said manual focusing mode.

25. A device for controlling an automatic focusing lens between an automatic focusing mode and a manual focusing mode, said device comprising:

a drive source;

means for operating said lens through said drive source in said automatic focusing mode;

means for operating said lens without said drive source in said manual focusing mode;

means for restricting a range in which said lens is operated in said automatic focusing mode; and means for switching a mode of operation of said lens to set said manual focusing mode, to set said automatic focusing mode while activating said restricting means, or to set said automatic focusing mode without activating said restricting means, said switching means being constructed as a single body.

* * * * *

UNITED STATES PATENT AND TRADEMARK OFFICE
CERTIFICATE OF CORRECTION

PATENT NO. : 5,177,524
DATED : January 5, 1993
INVENTOR(S) : H. TANAKA

It is certified that error appears in the above-indentified patent and that said Letters Patent is hereby corrected as shown below:

At column 12, line 57 (claim 19, line 6) change "thorugh" to ---through---.

Signed and Sealed this

Ninth Day of January, 1996

Attest:

BRUCE LEHMAN

*Attesting Officer*  *Commissioner of Patents and Trademarks*